(12) United States Patent
Chen

(10) Patent No.: US 10,314,291 B2
(45) Date of Patent: Jun. 11, 2019

(54) PET TOY

(71) Applicant: Li-Chen Chen, Tainan (TW)

(72) Inventor: Li-Chen Chen, Tainan (TW)

( * ) Notice: Subject to any disclaimer, the term of this patent is extended or adjusted under 35 U.S.C. 154(b) by 0 days.

(21) Appl. No.: 15/712,733

(22) Filed: Sep. 22, 2017

(65) Prior Publication Data

US 2019/0021285 A1 Jan. 24, 2019

(30) Foreign Application Priority Data

Jul. 21, 2017 (TW) .............................. 106210763 U

(51) Int. Cl.
A01K 15/02 (2006.01)

(52) U.S. Cl.
CPC .......... *A01K 15/025* (2013.01); *A01K 15/027* (2013.01)

(58) Field of Classification Search
CPC ..... A01K 15/025; A01K 5/0114; A01K 15/02
USPC .... 119/707, 708, 51.01, 710, 705, 711, 712; 446/437, 475
See application file for complete search history.

(56) References Cited

U.S. PATENT DOCUMENTS

| | | | | |
|---|---|---|---|---|
| 2,833,244 A * | 5/1958 | Bohlman | ............. | A01K 15/025 119/708 |
| D314,455 S * | 2/1991 | Morton | ......................... | D30/160 |
| 5,045,014 A * | 9/1991 | Harkins | ............... | A01K 15/025 446/236 |
| 5,474,032 A * | 12/1995 | Krietzman | ........... | A01K 15/025 119/708 |
| 5,657,721 A * | 8/1997 | Mayfield | .............. | A01K 15/025 119/707 |
| 5,819,690 A * | 10/1998 | Brown | .................. | A01K 5/0114 119/707 |
| 5,823,844 A * | 10/1998 | Markowitz | .......... | A01K 15/025 446/175 |
| D411,357 S * | 6/1999 | Baiera | ........................ | D30/160 |
| D426,036 S * | 5/2000 | Willinger | .................... | D30/160 |
| 6,575,119 B1 * | 6/2003 | Lonsway | ............. | A01K 15/025 119/707 |
| 6,604,489 B2 * | 8/2003 | Wilkes | .................... | A01K 15/02 119/705 |
| 6,629,510 B1 * | 10/2003 | Robkin | ................ | A01K 15/025 119/707 |
| 7,895,779 B2 * | 3/2011 | Schnuckle | ............. | A63H 13/02 119/708 |
| 8,011,326 B2 * | 9/2011 | del Pinal | .............. | A01K 15/025 119/707 |

(Continued)

*Primary Examiner* — Yvonne R Abbott-Lewis
(74) *Attorney, Agent, or Firm* — Li & Cai Intellectual Property (USA) Office

(57) ABSTRACT

A pet toy is provided, including a toy body having a lower case and an upper case, in which the bottom end of the lower case is formed as an arc-shaped end part; a counterweight unit disposed at the inboard bottom of the lower case and configured to locate the center of gravity of the toy body at the bottom of the lower case; and a decorative accessory disposed at the upper end of the toy body for attracting pets to play with the pet toy. An accommodating space is provided in the lower case, and an open hole is disposed at a side surface of the lower case for allowing a pet snack to drop out of the toy body through the open hole. The present disclosure is capable of effectively catching a pet's attention and stirring up the pet's interest in playing with the pet toy.

14 Claims, 8 Drawing Sheets

(56) References Cited

U.S. PATENT DOCUMENTS

| | | | | |
|---|---|---|---|---|
| 8,474,404 | B2 * | 7/2013 | Costello | A01K 15/025 |
| | | | | 119/51.01 |
| 8,640,647 | B2 * | 2/2014 | Dotterer | A01K 15/025 |
| | | | | 119/51.01 |
| D724,279 | S * | 3/2015 | Paculdo | D30/160 |
| 9,723,901 | B1 * | 8/2017 | Ober | A45B 9/04 |
| 2006/0254531 | A1 * | 11/2006 | Willinger | A01K 5/0114 |
| | | | | 119/710 |
| 2011/0083608 | A1 * | 4/2011 | Markham | A01K 5/0114 |
| | | | | 119/51.01 |
| 2017/0202182 | A1 * | 7/2017 | Bolter | A01K 5/02 |

* cited by examiner

PET TOY

BACKGROUND

1. Technical Field

The present disclosure relates to a pet toy; in particular, to a pet toy capable of interacting with a pet and a pet owner to maintain the pet's strength and amuse the pet.

2. Description of Related Art

Most urban dwellers like to keep pets in their houses, but tight living conditions would unavoidably make pets anxious and depressed and cause them a lack of vitality in the long term, thus endangering pets mentally and physically.

For the sake of remaining pets active and healthy, a pet owner may use toys to interact with a pet. By virtue of a pet toy, the pet owner may arouse the pet's curiosity to cultivate a lively character so as to keep its mobility. For example, a cat owner may tease a cat by using a cat stick, enabling the cat to chase after the cat stick to relax its body while arousing its curiosity. Alternatively, the pet may be given a pet doll served as a substitute to avoid potential anxieties and depression when the pet owner is unable to accompany the pet.

Traditional pet toys, however, are not fundamentally dynamic. After playing with a static pet toy for a longer duration, the pet would feel bored and lose the interest in the static toy. In addition, certain pet toys need to be functioned manually (e.g. a cat stick) to tease pets, so that spending time and efforts on playing with the pet would considerably consume the pet owner's energy. Due to a busy lifestyle and multiple distractions, the pet owner would be extremely exhausted and cannot take care of the pet, thus leaving the pet out in the cold inadvertently. If such a situation lasts for too long, it would inevitably result in adverse effects on the pet's mental and physical development.

In view of this, there is room for improvement in existing pet toys in terms of their poor usage effect.

SUMMARY

The primary purpose of the present disclosure is to provide a pet toy capable of actively attracting a pet, and rewarding the pet with a pet snack as an incentive to excite the pet's interest when the pet is playing with the pet toy.

According to one exemplary embodiment of the present disclosure, a pet toy is provided, including a toy body, a counterweight unit, and a decorative accessory. The toy body includes a lower case and an upper case, the upper end of the lower case has an opening part, the bottom end of the lower case has an arc-shaped end part, and the upper case is connected to the opening part of the upper end of the lower case. The counterweight unit is disposed at the inboard bottom of the lower case, and configured to locate the center of gravity of the toy body at the arc-shaped end part of the lower case to form the toy body as a tumbler-like structure. The decorative accessory is disposed at the upper end of the toy body for attracting a pet to fiddle with the decorative accessory. An interval is provided between the bottom surface of the upper case and the top surface of the counterweight unit for forming an accommodating space, a pet snack is placed in the accommodating space, an open hole is disposed on a side surface of the upper end of the lower case corresponding to the accommodating space, and a diameter of the open hole matches a size of the pet snack, so that when the toy body swings to and fro, the pet snack placed in the accommodating space can drop out of the toy body through the open hole.

In a preferred embodiment, the upper case and the lower case are connected to each other in a relative rotation manner, a baffle plate is disposed on the bottom surface of the upper case and is adjacent to the open hole disposed on the side surface of the lower case, and the baffle plate is close to an internal side of the open hole and has displacement varying with rotation of the upper case to change a relative position between the baffle plate and the open hole, so that an opening area of the open hole shielded by the battle changes accordingly.

In a preferred embodiment, a platen is disposed on the counterweight unit, the platen is horizontally disposed in the lower case, and the bottom surface of the platen attaches the top surface of the counterweight unit so as to position the counterweight unit inside the lower case.

In a preferred embodiment, a plurality of partition plates are disposed on the top surface of the platen, the plurality of partition plates protrude vertically from the top surface of the platen, a top surface height of each partition plate is lower than the bottom surface of the upper case, and the plurality of partition plates are arranged in a staggered manner; when the pet snack is rolling in the accommodating space, the plurality of partition plates interfere with a rolling path of the pet snack to make the pet snack roll irregularly.

In a preferred embodiment, the decorative accessory is disposed with a connecting rod, the bottom end of the connecting rod is connected to the top surface of the upper case of the toy body, and the top end of the connecting rod is disposed with a target object used to catch a pet's attention.

To sum up, the pet toy of the present disclosure is advantageous to effectively catch a pet's attention by means of the decorative accessory and the toy body swinging to and fro like a toy tumbler, and to further prolong the pet's attention span of playing by rewarding the pet with the pet snack placed inside the toy body as an incentive. Thus, the pet toy of the present disclosure is of extreme attractiveness. In addition, a pet can play with the pet toy provided by the present disclosure for a longer duration without suffering from boredom, so that the pet owner can spend less time and efforts on playing with the pet so as to save energy.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DESCRIPTION OF THE EXEMPLARY EMBODIMENTS

Figure 1:
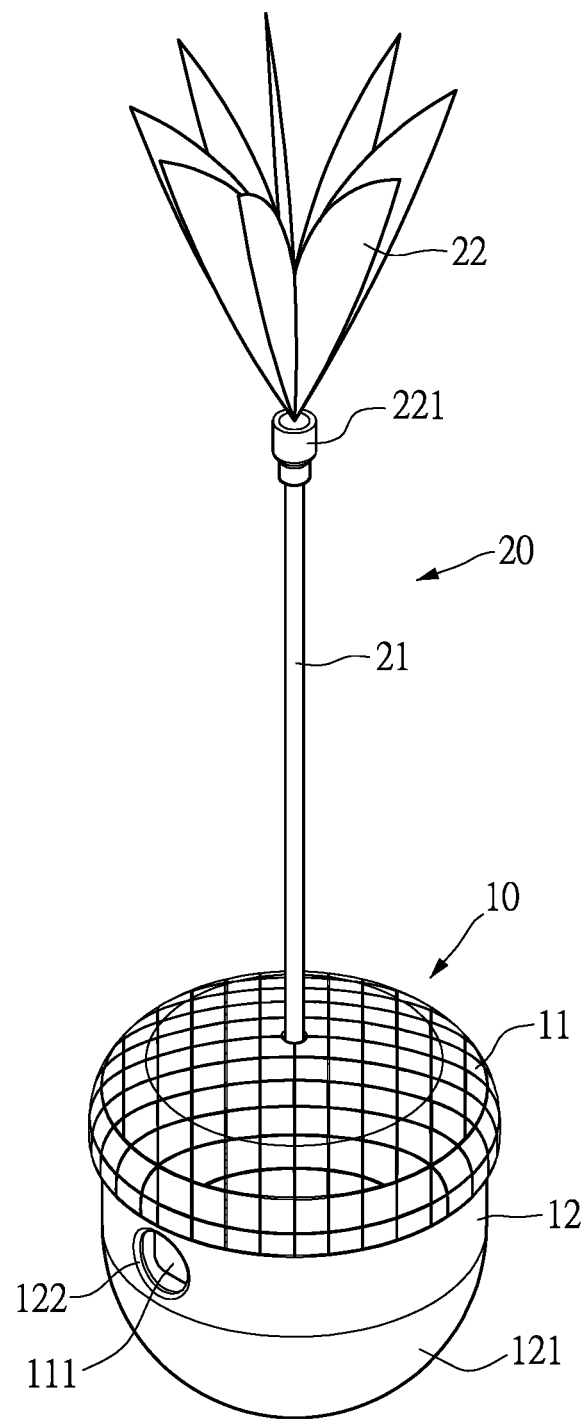
FIG. 1 is a three-dimensional diagram of the pet toy of the present disclosure that has been assembled completely.

Reference will now be made in detail to the exemplary embodiments of the present disclosure, examples of which are illustrated in the accompanying drawings. Wherever possible, the same reference numbers are used in the drawings and the description to refer to the same or like parts.

Figure 2:
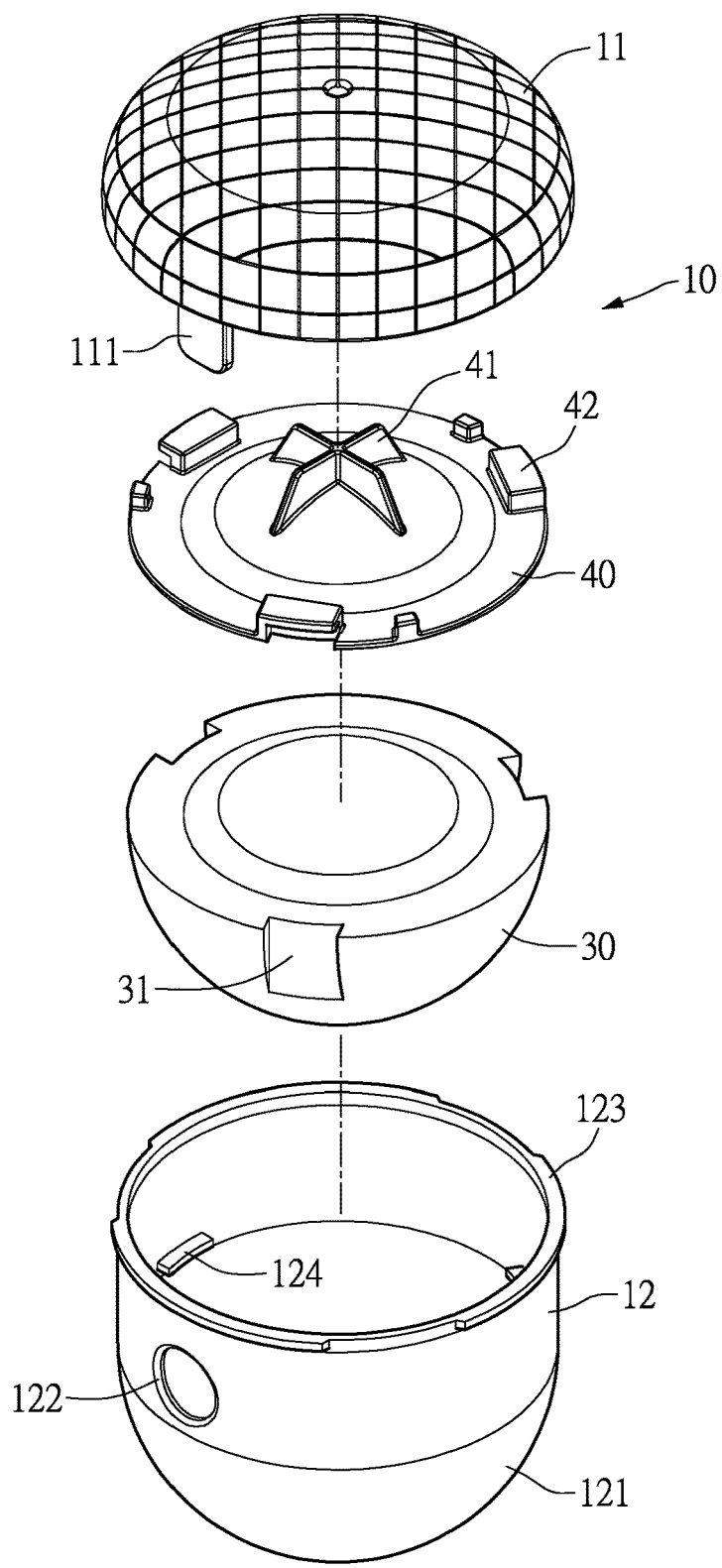
FIG. 2 is a three-dimensional exploded view illustrating the toy body and the counterweight unit of the pet toy of the present disclosure.
Figure 3:
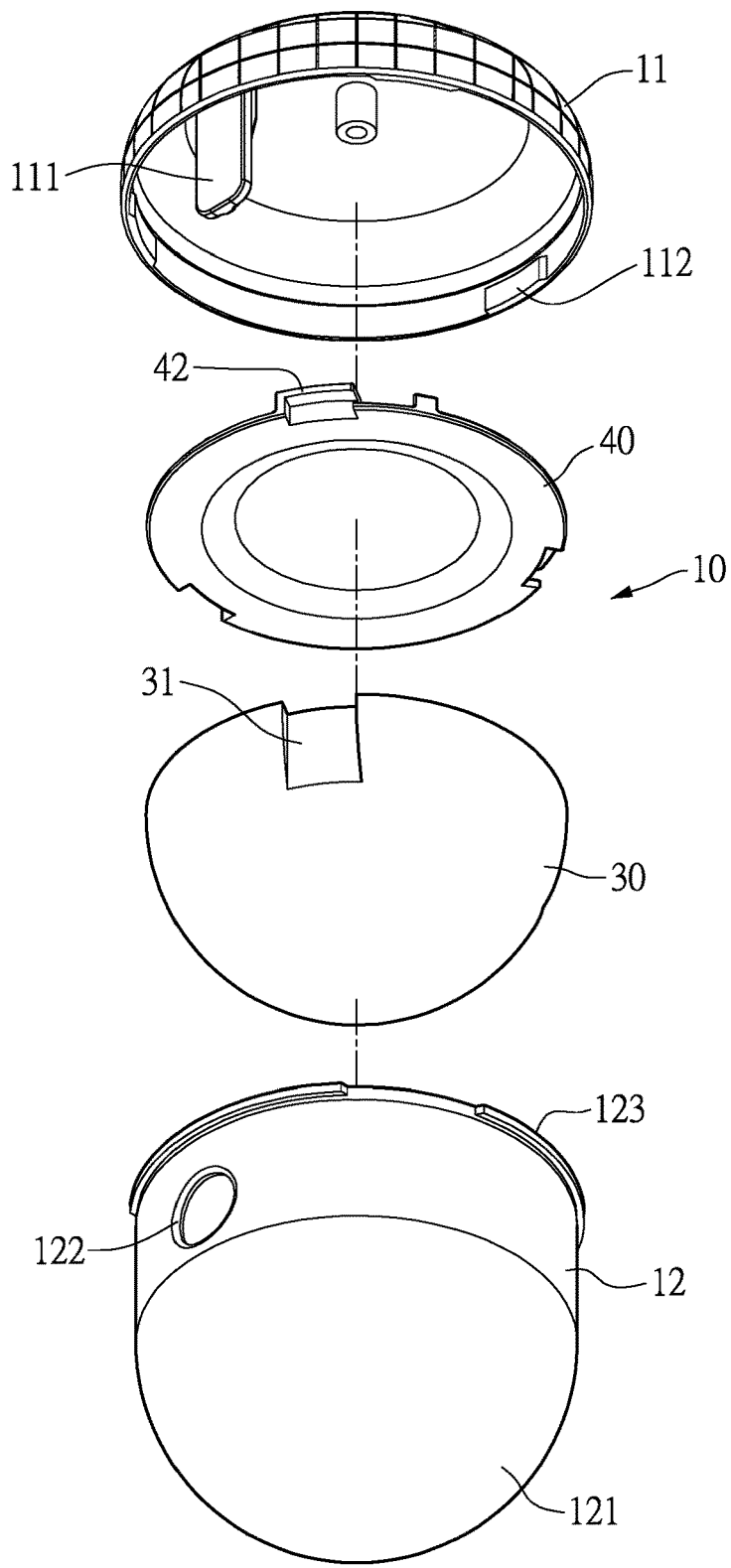
FIG. 3 is a three-dimensional exploded view illustrating the toy body and the counterweight unit of the pet toy of the present disclosure taken from another angle.

As shown in FIG. 1 to FIG. 3, the pet toy provided by the present disclosure includes a toy body 10, a counterweight unit 30 disposed inside the toy body 10, and a decorative accessory 20 disposed at the upper end of the toy body 10. The primary technical feature of the present disclosure is that the toy body 10 has a tumbler-like structure. When the toy body 10 is pushed by an external force to generate an inclined state, it can automatically return to a vertical position by means of the gravity effect. In addition, the decorative accessory 20 disposed at the upper end of the toy body 10 can draw a pet's attention and make the pet to fiddle with the decorative accessory 20, so that the toy body 10 swinging to and fro like a toy tumbler can attract and tease the pet.

An accommodating space is formed in the toy body 10 for receiving a pet snack, and the toy body 10 has an open hole 122. When the toy body 10 is fiddled by a pet to swing to and fro, the pet snack can drop out of the toy body 10 through the open hole 122 to catch the pet's attention more likely.

Figure 6:
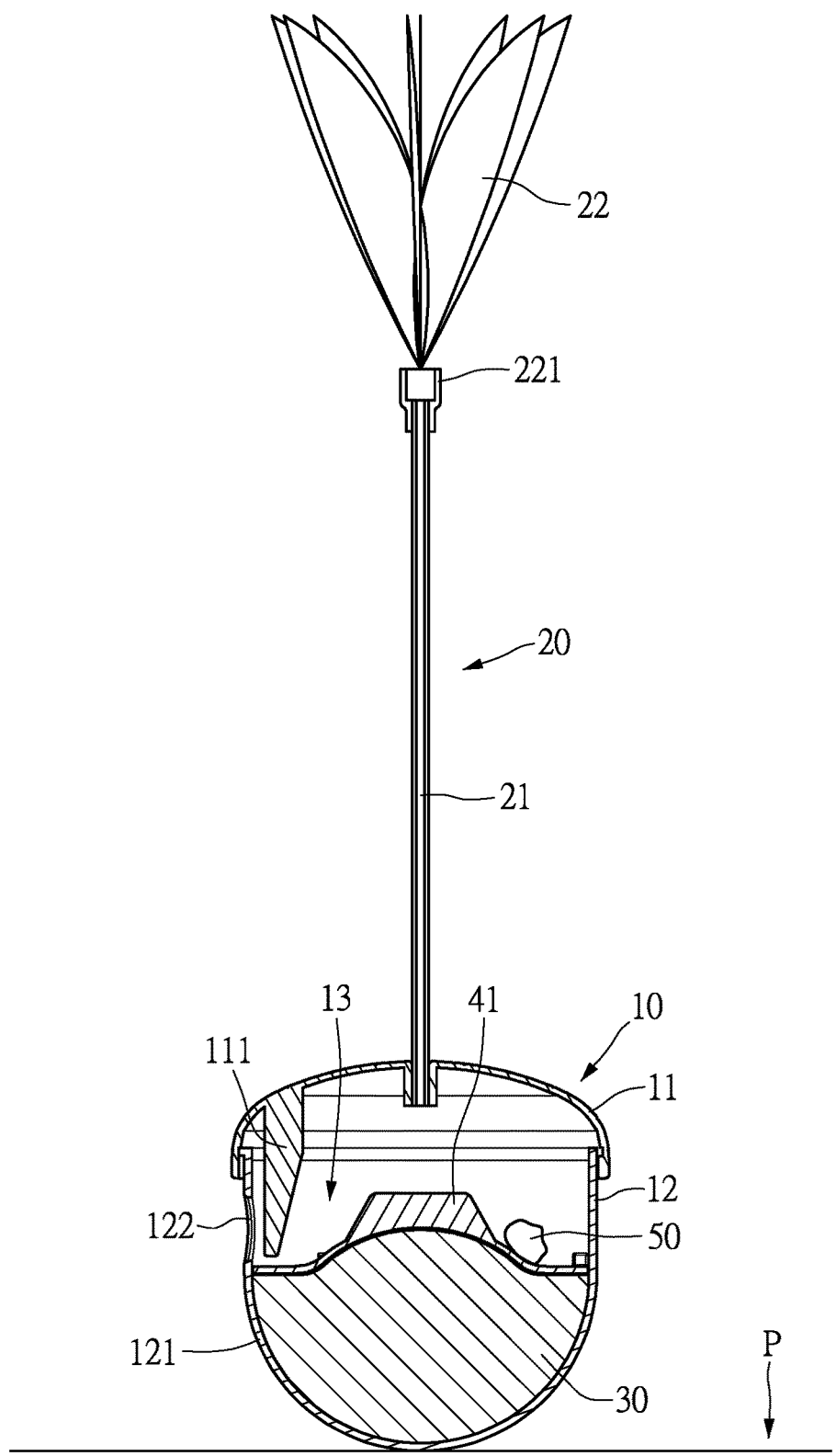
FIG. 6 is a sectional view illustrating the pet toy of the present disclosure on a plane and in a vertical position.
Figure 7:
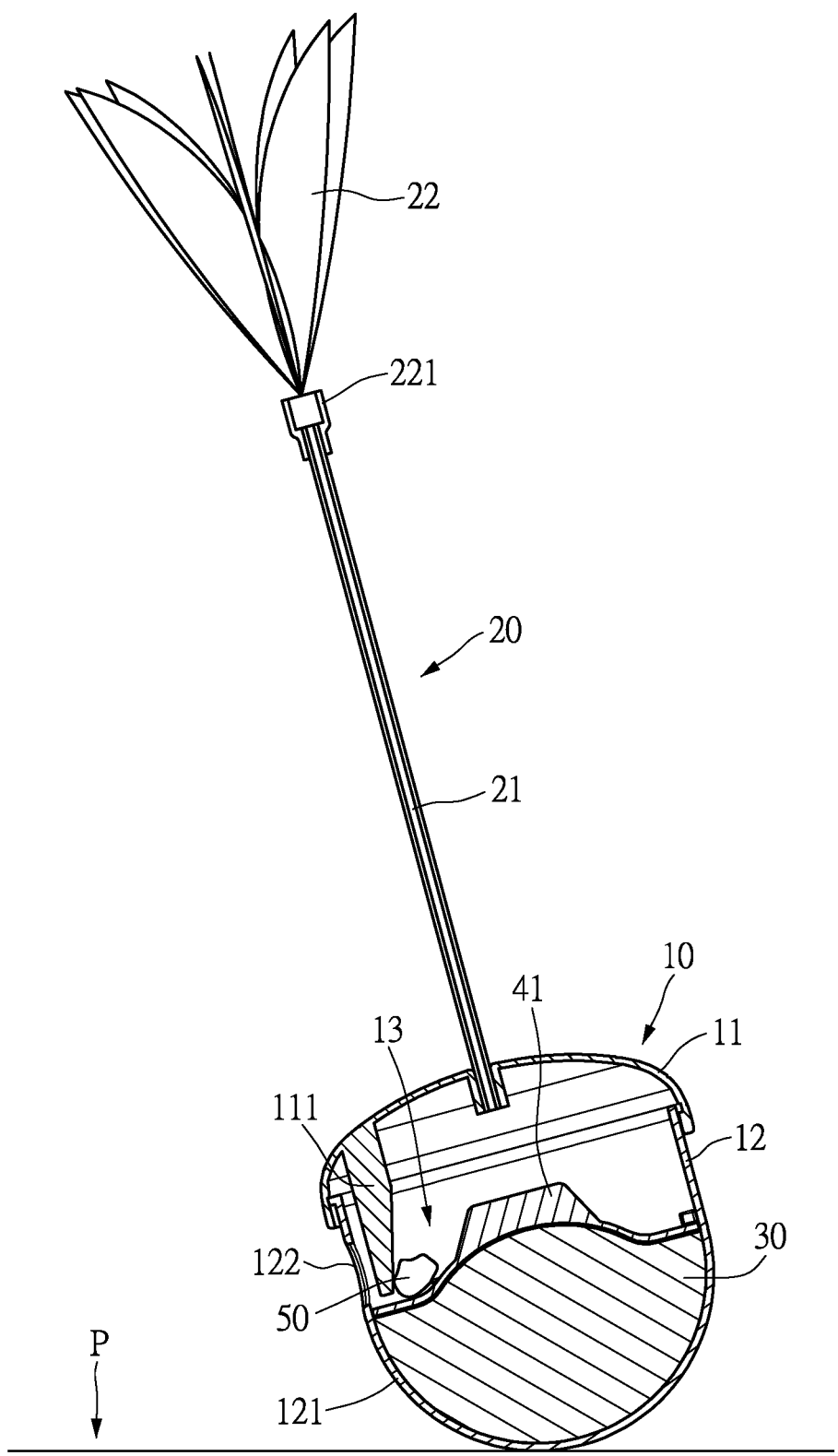
FIG. 7 is a sectional view illustrating the pet toy of the present disclosure in an inclined state after being fiddled by a pet.

As shown in FIG. 1, FIG. 6 and FIG. 7, the decorative accessory 20 is disposed at the top surface of the toy body 10. The decorative accessory 20 has a connecting rod 21, the bottom end of the connecting rod 21 is connected to the top surface of the toy body 10, and the top end of the connecting rod 21 is disposed with a target object 22. To be more precise, a sleeve part 221 is disposed at the bottom part of the target object 22 and the target object 22 is sleeved at the top end of the connecting rod 21 through the sleeve part 221, and the target object 22 can be detachably disposed at the top end of the connecting rod 21. As the target object 22 is connected to the upper end of the toy body 10 through the connecting rod 21, when a pet fiddles with the target object 22, the toy body 10 swings simultaneously.

In an embodiment, the target object 22 is a colorful feather and the decorative accessory 20 has a shape of a cat stick, thereby drawing a cat's attention. The target object 22 is replaceable, that is, it can be other decorations or toys, and thus the decorative accessory 20 can be designed to attract different pets according to practical needs. For example, the target object 22 may be designed to be a ball appearance (e.g. a tennis ball) to catch a dog's attention, or the target object 22 can be a rat-like doll to stir up a cat's hunting instinct.

As shown in FIG. 2 and FIG. 3, the toy body 10 is formed by assembling an upper case 11 and a lower case 12 in a relative rotation manner. An arc-shaped end part 121 is formed at the bottom part of the lower case 12, and an opening part is formed at the upper end of the lower case 12. A plurality of engaging flanges 123 are formed along a periphery of the opening part in a horizontal direction. The upper case 11 covers the opening part of the lower case 12, and an internal side wall of the side surface of the upper case 11 is inwards convexly provided with a plurality of protrusion parts 112. When the upper case 11 is connected to the upper end of the lower case 12, each protrusion part 112 can engage with the bottom side surface of each engaging flange 123, thereby enabling the upper case 12 to symmetrically engage with the lower case 12. The plurality of engaging flanges 123 are formed in a horizontal direction, and a length of each engaging flange 123 is greater than a width of each protrusion part 112 of the upper case 11, so that the upper case 11 and the lower case 12 can be relatively rotated within a specific angular range.

As shown in FIG. 2 to FIG. 5, the lower case 12 is a hollow case and the counterweight unit 30 is disposed inside the lower case 12. An arc-shaped internal wall is formed at the inboard bottom of the lower case 12, and the bottom shape of the counterweight unit 30 matches the shape of the arc-shaped internal side wall formed at the inboard bottom end of the lower case 12, so that the counterweight unit 30 can be received inside the lower case 12.

As shown in FIG. 6 and FIG. 7, the counterweight unit 30 can locate the center of gravity of the toy body 10 at the bottom of the lower case 12. As the bottom end of the lower 12 is provided with the arc-shaped end part 121, when the toy body 10 is placed on a planar part P (e.g. a table top or a ground), the toy body 10 contacts the planar part P through the arc-shaped end part 121. When the toy body 10 is pushed by an external force to generate an inclined state, the toy body 10 can automatically return to a vertical position by means of the gravity effect so as to swing to and fro like a tumbler toy. As an animated object would catch a pet's attention more easily, when the pet toy of the present disclosure is fiddled by a pet to swing to and fro like an alive object, the pet would consider the pet toy of the present disclosure as a living object to have more fun playing with it.

Figure 4:
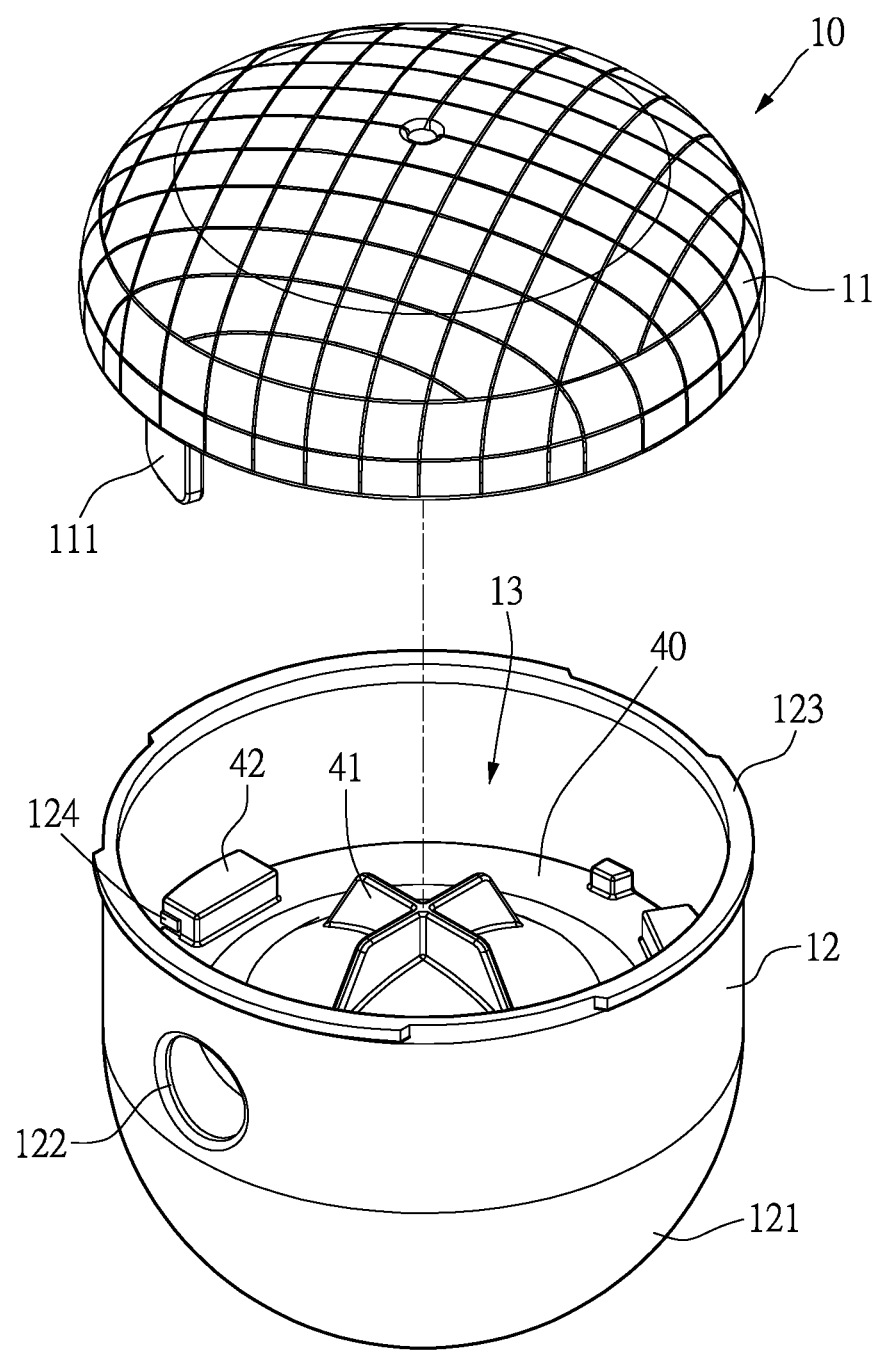
FIG. 4 is a three-dimensional view illustrating a part of the toy body and the counterweight unit of the pet toy of the present disclosure.
Figure 5:
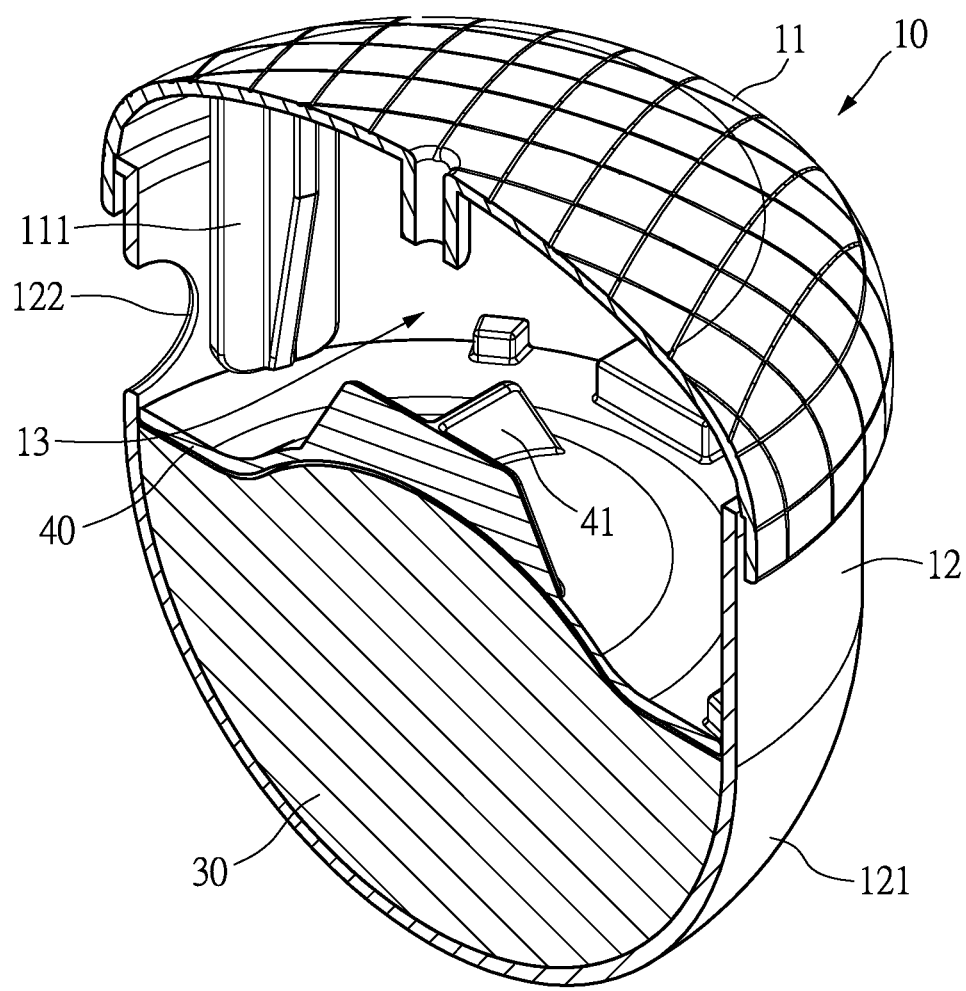
FIG. 5 is a sectional view of the toy body and the counterweight unit of the pet toy of the present disclosure.

As shown in FIG. 4 and FIG. 5, when the toy body 10 and the counterweight unit 30 are assembled, there is an interval between the top surface of the counterweight unit 30 and the bottom surface of the toy body 10 for forming an accommodating space 13, and the open hole 122 is disposed on a side surface of the upper end of the lower case 12 corresponding to a height position of the accommodating space 13. As shown in FIG. 6 and FIG. 7, a pet snack 50 is placed in the accommodating space 13 and a diameter of the open hole 122 matches a size of the pet snack 50, so that the pet snack can be placed in or drop out of the accommodating space 13 through the open hole 122.

Figure 8:
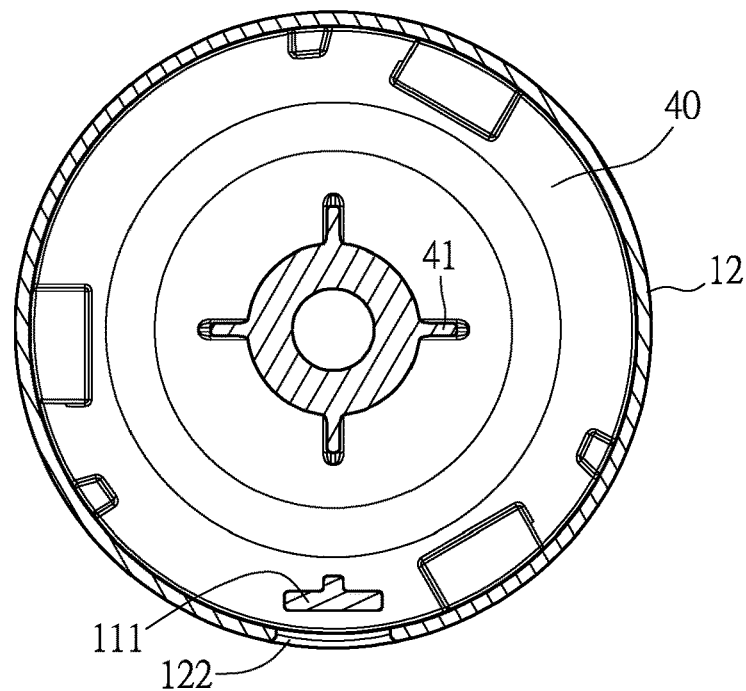
FIG. 8 and FIG. 9 are top views respectively illustrating a relative position between the baffle plate and the open hole and the operation of adjusting an opening area of the open hole through the battle.
Figure 9:
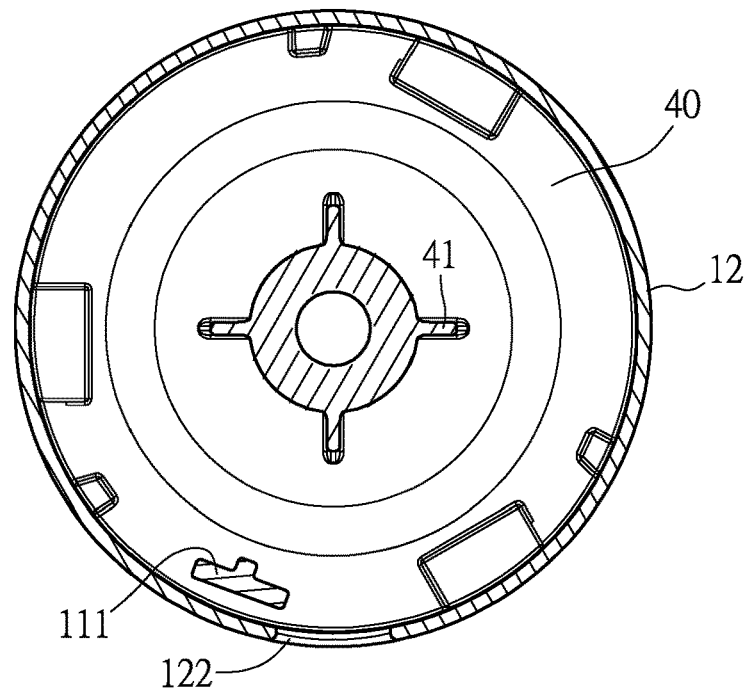

In addition, a baffle plate 111 is disposed on the bottom surface of the upper case 11 and is adjacent to the open hole 122 disposed on the side surface of the lower case 12. The baffle plate 111 is close to an internal side of the open hole 122 and has displacement varying with rotation of the upper case 11. As shown in FIG. 8 and FIG. 9, when the baffle plate 111 has displacement varying with rotation of the upper case 11, a relative position between the baffle plate 111 and the open hole 122 changes, so that an opening area of the open hole 122 shielded by the battle plate 111 changes accordingly. Thus, a user can rotate the upper case 11 to change an opening area of the open hole 122 shielded by the battle plate 111 to adjust an opening area of the open hole 122, thereby controlling difficulty levels of the pet snack 50 placed in the accommodating space 13 dropping out of the toy body 10 through the open hole 122.

By virtue of the aforementioned design, a user can place pet snacks or pet refreshments in the toy body 10, so that when the pet fiddles with the toy body 10, the pet snack 50 can randomly drop out of the toy body 10, thereby stimulating the pet's interest in playing with the toy body 10 and rewarding the pet with a pet snack as an incentive for animal training. In addition, a user can adjust the opening area of the open hole 122 to control difficulty levels of the pet snack 50 placed in the accommodating space 13 dropping out of the toy body 10 through the open hole 122, thereby extending the time of the pet snack 50 dropping out of the toy body 10. Thus, the pet's attention span of playing the pet toy can be prolonged to relieve the pet of potential distractions and anxieties.

In addition, for the sake of positioning the counterweight unit 30 inside the lower case 12, a platen 40 is disposed on the counterweight unit 30. The platen 40 is horizontally disposed in the lower case 12, and the bottom surface of the platen 40 attaches the top surface of the counterweight unit 30, thereby positioning the counterweight unit 20 inside the lower case 12. Moreover, a plurality of longitudinal clamping slots 31 are disposed at a side surface of the counterweight unit 30, and the internal side wall of the lower case 12 which corresponds to the plurality of clamping slots 31 is provided with a plurality of clamping sections 124. When the counterweight unit 30 is placed inside the lower case 12, the plurality of clamping sections 124 clamp the plurality of clamping slots 31 disposed at the side surface of the counterweight unit 30, thereby positioning the counterweight unit 30.

The periphery of the platen 40 which corresponds to the positions of the plurality of clamping sections 124 is provided with a plurality of clamping parts 42, and the plurality of clamping parts 42 clamp the plurality of clamping sections 124 disposed on the internal side wall of the lower case 12 to position the platen 40 on the counterweight unit 30, thereby positioning the platen 40 and the counterweight unit 30 inside the lower case 12.

A plurality of partition plates 41 are disposed on the top surface of the platen 40. As shown in FIG. 4, the plurality of partition plates 41 protrude vertically from the top surface of the platen 40, the top surface height of each partition plate 40 is lower than the bottom surface of the upper case 11, and the plurality of partition plates 41 are arranged in a staggered manner. As shown in FIG. 6 and FIG. 7, when the pet snack 50 is rolling in the accommodating space 13, the plurality of partition plates 41 interfere with a rolling path of the pet snack 50 to make the pet snack 50 roll irregularly. Thus, when the toy body 10 swings to and fro, the uncertainty of the pet snack 50 dropping out of the toy body 10 through the open hole 122 can increase the playfulness and raise the challenge.

In summary, the present disclosure is advantageous to actively catch a pet's attention through the decorative accessory 20, and can swing to and fro like a tumbler toy for teasing the pet. In addition, as the pet snack 50 is placed in the toy body 10, the pet can focus on playing with the pet toy while at the same time looking forward to obtaining the pet snack 50. Consequently, the present disclosure has compelling attractiveness and the pet can enjoy playing with it without losing interest, albeit playing for a long time, so that the pet owner can spend less time on playing with the pet to spare time and efforts.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A pet toy, comprising:
    a toy body including a lower case and an upper case, wherein an upper end of the lower case has an opening part, a bottom end of the lower case has an arc-shaped end part, and the upper case is connected with the opening part of the upper end of the lower case;
    a counterweight unit disposed at an inboard bottom of the lower case, and configured to locate the center of gravity of the toy body at the arc-shaped end part of the lower case to form the toy body as a tumbler-like structure;
    a decorative accessory, disposed at the upper end of the toy body for attracting a pet to fiddle with the decorative accessory; and
    wherein an interval is provided between a bottom surface of the upper case and a top surface of the counterweight unit for forming an accommodating space for receiving a pet snack an open hole is disposed on a side surface of the upper end of the lower case corresponding to the accommodating space, and a diameter of the open hole matches a size of the pet snack, so that when the toy body swings to and fro, the pet snack placed in the accommodating space drops out of the toy body through the open hole; and
    wherein a plurality of engaging flanges are formed on a side surface of the upper end of the lower case in a horizontal direction, and an internal side wall of the side surface of the upper case is inwards convexly provided with a plurality of protrusion parts; when the upper case is connected to the upper end of the lower case, each protrusion part engages with a bottom side surface of each engaging flange, so that the upper case and the lower case are connected to each other in a relative rotation manner.

2. The pet toy according to claim 1, wherein a baffle plate is disposed on the bottom surface of the upper case and is adjacent to the open hole disposed on the side surface of the lower case, and the baffle plate is close to an internal side of the open hole and has displacement varying with rotation of the upper case to change a relative position between the baffle plate and the open hole, so that an opening area of the open hole shielded by the baffle plate changes accordingly.

3. The pet toy according to claim 1, wherein an arc-shaped internal wall is formed at the inboard bottom of the lower case, a bottom shape of the counterweight unit matches a shape of the arc-shaped internal wall, and the counterweight unit is received at the inboard bottom of the lower case.

4. The pet toy according to claim 3, wherein a platen is disposed on the counterweight unit, the platen is horizontally disposed in the lower case, and the bottom surface of the platen attaches the top surface of the counterweight unit so as to position the counterweight unit inside the lower case.

5. The pet toy according to claim 4, wherein a plurality of partition plates are disposed on a top surface of the platen, the plurality of partition plates protrude vertically from the top surface of the platen, a top surface height of each partition plate is lower than the bottom surface of the upper case, and the plurality of partition plates are arranged in a staggered manner; when the pet snack is rolling in the accommodating space, the plurality of partition plates interfere with a rolling path of the pet snack to make the pet snack roll irregularly.

6. The pet toy according to claim 1, wherein the decorative accessory has a connecting rod, and the bottom end of the connecting rod is connected to the top surface of the upper case of the toy body and a top end of the connecting rod is disposed with a target object used to catch a pet's attention.

7. The pet toy according to claim 6, wherein a sleeve part is disposed at a bottom part of the target object, the target object is sleeved at the top end of the connecting rod through the sleeve part, and the target object is detachably disposed at the top end of the connecting rod.

8. A pet toy, comprising:
- a toy body including a lower case and an upper case, wherein an upper end of the lower case has an opening part, a bottom end of the lower case has an arc-shaped end part, and the upper case is connected with the opening part of the upper end of the lower case;
- a counterweight unit disposed at an inboard bottom of the lower case, and configured to locate the center of gravity of the toy body at the arc-shaped end part of the lower case to form the toy body as a tumbler-like structure;
- a decorative accessory, disposed at the upper end of the toy body;
- wherein an interval is provided between a bottom surface of the upper case and a top surface of the counterweight unit for forming an accommodating space for receiving a pet snack, an open hole is disposed on a side surface of the upper end of the lower case corresponding to the accommodating space; and
- wherein an arc-shaped internal wall is formed at the inboard bottom of the lower case, a bottom shape of the counterweight unit matches a shape of the arc-shaped internal wall, and the counterweight unit is received at the inboard bottom of the lower case.

9. The pet toy according to claim 8, wherein a platen is disposed on the counterweight unit, the platen is horizontally disposed in the lower case, and the bottom surface of the platen attaches the top surface of the counterweight unit so as to position the counterweight unit inside the lower case.

10. The pet toy according to claim 9, wherein a plurality of partition plates are disposed on a top surface of the platen, the plurality of partition plates protrude vertically from the top surface of the platen, a top surface height of each partition plate is lower than the bottom surface of the upper case, and the plurality of partition plates are arranged in a staggered manner; when the pet snack is rolling in the accommodating space, the plurality of partition plates interfere with a rolling path of the pet snack to make the pet snack roll irregularly.

11. The pet toy according to claim 8, wherein the upper case and the lower case are connected with each other in a relative rotation manner, a baffle plate is disposed on the bottom surface of the upper case and is adjacent to the open hole disposed on the side surface of the lower case, and the baffle plate is close to an internal side of the open hole and has displacement varying with rotation of the upper case to change a relative position between the baffle plate and the open hole, so that an opening area of the open hole shielded by the baffle plate changes accordingly.

12. The pet toy according to claim 11, wherein a plurality of engaging flanges are formed on a side surface of the upper end of the lower case in a horizontal direction, and an internal side wall of the side surface of the upper case is inwards convexly provided with a plurality of protrusion parts; when the upper case is connected to the upper end of the lower case, each protrusion part engages with a bottom side surface of each engaging flange, so that the upper case and the lower case are connected to each other in a relative rotation manner.

13. The pet toy according to claim 8, wherein the decorative accessory has a connecting rod, and the bottom end of the connecting rod is connected to the top surface of the upper case of the toy body and a top end of the connecting rod is disposed with a target object used to catch a pet's attention.

14. The pet toy according to claim 13, wherein a sleeve part is disposed at a bottom part of the target object, the target object is sleeved at the top end of the connecting rod through the sleeve part, and the target object is detachably disposed at the top end of the connecting rod.

* * * * *